US006996621B1

(12) United States Patent
Borella et al.

(10) Patent No.: US 6,996,621 B1
(45) Date of Patent: Feb. 7, 2006

(54) METHOD FOR SUPPORTING SECONDARY ADDRESS DELIVERY ON REMOTE ACCESS SERVERS

(75) Inventors: Michael S. Borella, Naperville, IL (US); Boby Joseph, Mount Prospect, IL (US); David A. Grabelsky, Skokie, IL (US)

(73) Assignee: 3Com Corporation, Santa Clara, CA (US)

( * ) Notice: Subject to any disclaimer, the term of this patent is extended or adjusted under 35 U.S.C. 154(b) by 538 days.

(21) Appl. No.: 09/731,333

(22) Filed: Dec. 6, 2000

Related U.S. Application Data

(60) Provisional application No. 60/169,534, filed on Dec. 7, 1999.

(51) Int. Cl.
*G06F 15/16* (2006.01)
(52) U.S. Cl. .................. 709/228; 709/224; 709/245; 370/352; 370/389
(58) Field of Classification Search ................ 709/228, 709/245; 370/352, 389
See application file for complete search history.

(56) References Cited

U.S. PATENT DOCUMENTS

| | | | |
|---|---|---|---|
| 4,953,198 A | 8/1990 | Daly et al. ............... 379/61 |
| 5,159,592 A | 10/1992 | Perkins ................ 370/85.7 |
| 5,227,778 A | 7/1993 | Vacon et al. .......... 340/825.52 |
| 5,327,365 A | 7/1994 | Fujisaki et al. ............ 364/717 |
| 5,497,339 A | 3/1996 | Bernard ................ 364/705.5 |
| 5,526,353 A | 6/1996 | Henley et al. ............ 370/60.1 |
| 5,526,489 A | 6/1996 | Nilakantan et al. ..... 395/200.02 |
| 5,550,984 A | 8/1996 | Gelb ..................... 395/200.17 |
| 5,604,737 A | 2/1997 | Iwami et al. ............ 370/352 |
| 5,606,594 A | 2/1997 | Register et al. ............. 379/58 |
| 5,636,216 A | 6/1997 | Fox et al. ................... 370/402 |
| 5,654,957 A | 8/1997 | Koyama .................... 370/355 |
| 5,708,655 A | 1/1998 | Toth et al. .................. 370/313 |
| 5,737,333 A | 4/1998 | Civanlar et al. ............ 370/352 |
| 5,742,596 A | 4/1998 | Baratz et al. ............... 370/356 |
| 5,754,547 A | 5/1998 | Nakazawa .................. 370/401 |
| 5,793,657 A | 8/1998 | Nemoto ................. 364/717.01 |
| 5,793,763 A | 8/1998 | Mayes et al. ............... 370/389 |
| 5,812,819 A | 9/1998 | Rodwin et al. ............. 395/500 |
| 5,835,723 A | 11/1998 | Andrews et al. ........ 395/200.56 |
| 5,862,331 A | 1/1999 | Herriot .................. 395/200.49 |
| 5,867,495 A | 2/1999 | Elliott et al. ................ 370/352 |
| 5,867,660 A | 2/1999 | Schmidt et al. ......... 395/200.57 |
| 5,872,847 A | 2/1999 | Boyle et al. .................. 380/25 |
| 5,889,774 A | 3/1999 | Mirashrafi et al. .......... 370/352 |

(Continued)

FOREIGN PATENT DOCUMENTS

WO WO 01/31888 A1 5/2001

OTHER PUBLICATIONS

G. Montene, Internet Engineering Task Force, Internet Draft, "Negotiated Address Reuse" (NAR), <draft-montene-gro-aatn-nar-00.txt>, May 1998, pp. 1 to 22.

(Continued)

*Primary Examiner*—David Wiley
*Assistant Examiner*—Thanh T Nguyen
(74) *Attorney, Agent, or Firm*—McDonnell Boehnen Hulbert & Berghoff LLP

(57) ABSTRACT

The present invention provides a method to support the delivery of the IP address of a secondary address server to a dial-up remote access client. The secondary address server may be an RSIP server, with which the client may perform an RSIP negotiation resulting in the client being assigned an IP address associated with the RSIP server.

18 Claims, 8 Drawing Sheets

U.S. PATENT DOCUMENTS

| | | | | |
|---|---|---|---|---|
| 5,892,924 | A | 4/1999 | Lyon et al. | 395/200.75 |
| 5,915,008 | A | 6/1999 | Dulman | 379/201 |
| 5,933,778 | A | 8/1999 | Buhrmann et al. | 455/461 |
| 5,950,195 | A | 9/1999 | Stockwell et al. | 707/4 |
| 6,011,782 | A | 1/2000 | DeSimone et al. | 370/260 |
| 6,055,236 | A | 4/2000 | Nessett et al. | 370/389 |
| 6,055,561 | A | 4/2000 | Feldman et al. | 709/200 |
| 6,058,421 | A | 5/2000 | Fijolek et al. | 709/225 |
| 6,079,021 | A | 6/2000 | Abadi et al. | 713/202 |
| 6,101,189 | A | 8/2000 | Tsuruoka | 370/401 |
| 6,101,543 | A | 8/2000 | Alden et al. | 709/229 |
| 6,104,711 | A | 8/2000 | Voit | 370/352 |
| 6,115,751 | A | 9/2000 | Tam et al. | 709/240 |
| 6,134,591 | A | 10/2000 | Nickles | 709/229 |
| 6,137,791 | A | 10/2000 | Frid et al. | 370/352 |
| 6,157,950 | A | 12/2000 | Krishnan | 709/223 |
| 6,172,986 | B1 | 1/2001 | Watanuki et al. | 370/466 |
| 6,185,184 | B1 | 2/2001 | Mattaway et al. | 370/230 |
| 6,195,705 | B1 | 2/2001 | Leung | 709/245 |
| 6,212,183 | B1 | 4/2001 | Wilford | 370/392 |
| 6,212,563 | B1 | 4/2001 | Beser | 709/227 |
| 6,249,820 | B1 | 6/2001 | Dobbins et al. | 709/238 |
| 6,266,707 | B1 | 7/2001 | Boden et al. | 709/245 |
| 6,269,099 | B1 | 7/2001 | Borella et al. | 370/389 |
| 6,353,614 | B1 * | 3/2002 | Borella et al. | 370/389 |
| 6,353,891 | B1 | 3/2002 | Borella et al. | 713/200 |
| 6,697,354 | B1 * | 2/2004 | Borella et al. | 370/352 |
| 6,708,219 | B1 * | 3/2004 | Borella et al. | 709/245 |

OTHER PUBLICATIONS

George Tsirtsis, Alan O'Neill, Internet Engineering Task Force, Internet Draft, "NAT Bypass for End 2 End 'Sensitive' Applications," <draft-tsirtsis-nat-bypass-00.txt>, Jan. 1998, pp. 1 to 5.

George Tsirtsis, Pyda Srishuresh, Internet Engineering Task Force, Internet Draft, "Network Address Translation—Protocol Translation" (NAT-PT), <draft-ietf-ngtrans-natpt-04.txt>, Jan. 1999, pp. 1 to 13.

Jeffrey Lo, K. Taniguchi, Internet Engineering Task Force, Internet Draft, "IP Host Network Address (and port) Translation," <draft-ieft-nat-hnat-00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft-borella-aatn-dnat-01.txt>, Oct. 1998, pp. 1 to 21.

P. Srisuresh, G. Tsirtsis, P. Akkiraju, A. Heffernan, Internet Engineering Task Force, Internet Draft, "DNS Extensions to Network Address Translators" (DNS_ALG), <draft-ietf-nat-dns-alg-01.txt>, Oct. 1998, pp. 1 to 24.

P. Srisuresh, Internet Engineering Task Force, Internet Draft "Security for IP Network Address Translator (NAT) Domains," <draft-ietf-nat-security-00.txt.>, Nov. 1998, pp. 1 to 11.

P. Srisuresh, K. Eg, Internet Engineering Task Force, Internet Draft, "The IP Network Address Translator" (NAT), <draft-rfced-info-srisuresh-05.txt>, Feb. 1998, pp. 1 to 24.

P. Srisuresh, K. Egev, Internet Engineering Task Force, Internet Draft, "Traditional IP Network Address Translator (Traditional NAT)," <draft-ietf-nat-traditional-01.txt>, Oct. 1998, pp. 1 to 17.

P. Srisuresh, Matt Holdrege, Internet Engineering Task Force, Internet Draft, "IP Network Address Translator (NAT) Terminology and Considerations," <draft-ietf-nat-terminology-01.txt>, Oct. 1998, pp. 1 to 28.

Praveen Akkiraju, Yakov Rekhter, Internet Engineering Task Force, Internet Draft, "A Multihoming Solution Using NATs" <draft-akkiraju-nat-multihoming-00.txt>, Nov. 1998, pp. 1 to 32.

R. G. Moskowitz, Internet Engineering Task Force, Internet Draft, "Network Address Translation Issues with IPsec," <draft-moskowitz-net66-vpn-00.txt>, Feb. 6, 1998, pp. 1 to 8.

R. Thay, N. Doraswa and R. Gle, Internet Engineering Task Force, Internet Draft "IP Security," <draft-ietf-ipsec-doc-roadmap-02.txt.>, Nov. 1997, pp. 1 to 12.

T. Hain, Internet Engineering Task Force, Internet Draft, "Architectural Implications of NAT," <draft-iab-nat-implications-02.txt>, Oct. 1998, pp. 1 to 14.

W.T. Teo, S.W. Yeow, R. Singh, Internet Engineering Task Force, Internet Draft, "IP Relocation Through Twice Network Address Translators," <draft-ietf-nat-rnat-00.txt>, Feb. 1999, pp. 1 to 20.

W.T. Teo, S.W. Yeow, R. Singh, Internet Engineering Task Force, Internet Draft, "Reverse Twice Network Address Translators" (RAT), <draft-teoyeow-mip-rat-01.txt>, Dec. 1998, pp. 1 to 20.

W.T. Teo, Y. Li, Internet Engineering Task Force, Internet Draft, "Mobile IP Extension for Private Internets Support," <draft-teoyli-mobileip-mvpn-02.txt>, Feb. 1999, pp. 1 to 24.

Yakov Rekhter, Internet Engineering Task Force, Internet Draft, "Implications of NATs on the TCP/IP Architecture," <draft-ietf-nat-arch-implications-00.txt>, Feb. 1999, pp. 1 to 7.

K. Egevang, and P. Francis, Internet Engineering Task Force, ("IETF"), Request for Comments ("RFC") RFC-1631, "The IP Network Address Translator (NAT)", May 1994, pp. 1-10.

Borella, Michael, *Technology Update—Protocol Helps Stretch IPv4 Addresses,* "Network World", vol. 17, No. 3, Jan. 17, 2000, p. 43.

Kent, Stephen, *Evaluating Certification Authority Security,* Aerospace Conference, 1998 IEEE, Online, vol. 4, pp. 319-327 (Mar. 21-23, 1998).

Thayer, Rodney, *Bulletproof IP With Authentication and Encryption IPSec Adds a Layer of Armor to IP,* Data Communications, vol. 26, No. 16, pp. 55-58, 60 (Nov. 21, 1997).

Borella, M., Grabelsky, D., Lo, J., Tuniguchi, K., Internet Engineering Task Force, Internet Draft, "Realm Specific IP: Protocol Specification <draft-ietf-nat-rsip-protocol-.06.txt>", Mar. 2000, pp. 1-48.

Borella, M., Grabelsky, D., Lo, J., Tuniguchi, K., Internet Engineering Task Force, Internet Draft, "Realm Specific IP: Protocol Specification <draft-ietf-nat-rsip-protocol-.07.txt>", Jul. 2000, pp. 1-49.

Montenegro, G., Internet Engineering Task Force, Internet Draft, "RSIP Support for End-to-End IPsec," <draft-ietf-nat-rsip-ipsec-04.txt>, Jul. 2000, pp. 1 to 17.

Borella, M., Lo, J., Grabelsky, D., Montenegro, G., Internet Engineering Task Force, Internet Draft, "Realm Specific IP: Framework <draft-ietf-nat-rsip-framework-.05.txt>", Jul. 2000, pp. 1-30.

Borella, M., Montenegro, G., *RSIP: Address Sharing with End-To-End Security,* USENIX Conference, San Francisco, California, Mar. 9, 2000, pp. 1-9.

Handley, M., et al. *SIP: Session Initiation Protocol,* Network Working Group, Request for Comments 2543, Mar. 1999, pp. 1 to 153.

ITU-T Recommendation H.225.0, *Call Signaling Protocols and Media Stream Packetization for Packet-Based Multimedia Communication Systems,* Series H: Audiovisual and Multimedia Systems—Infrastructure of Audiovisual Services—Transmission Multiplexing and Synchronization, (Feb., 1998).

ITU-T Recommendation H.323, *Packet-Based Multimedia Communications Systems,* Series H: Audiovisual and Multimedia Systems—Infrastructure of Audiovisual Services—Systems and Terminal Equipment for Audiovisual Services, (Feb., 1998).

McCanne et al., "The BSD Packet Filter: A New Architecture for User-Level Packet Capture," Proceedings of the 1993 Winter USENIX Technical Conference (Jan. 1993).

Postel, J., *User Datagram Protocol*, Request for Comments 768, Aug. 1980, pp. 1 to 3.

Postel, J., *Internet Protocol,* Request for Comments 791, Sep. 1981, pp. 1 to 45.

Postel J., *Internet Control Message Protocol,* Request for Comments 792, Sep. 1981, pp. 1 to 21.

Postel, J., *Transmission Control Protocol,* Request for Comments 793, Sep. 1981, pp. i to 84.

Postel, J., *File Transfer Protocol (FTP),* Request for Comments 959, Oct. 1985, pp. 1 to 69.

Jacobson, V., *TCP Extensions for High Performance,* Request for Comments 1323, May 1992, pp. 1 to 37.

Droms, R., *Dynamic Host Configuration Protocol,* Request for Comments 2131, Mar. 1997, pp. 1 to 45.

Stevens, W., *Advanced Sockets API for IPv6,* Request for Comments 2292, Feb. 1998, pp. 1 to 67.

Gilligan, R. et al., *Basic Socket Interface Extensions for IPv6,* Request for Comments 2553, Mar. 1999, pp. 1 to 41.

Srisuresh, P.,et al., *IP Network Address Translator (NAT) Terminology and Considerations,* Request for Comments 2663, Aug. 1999, pp. 1 to 30.

Maurice J. Bach, The Design of the Unix Operating System, Prentice Hall Software Series, 1986, pp. 382-390.

"Cisco IOS Release 12.0 Network Protocols Configuration Guide, Part 1", Configuring IP Addressing, Cisco Systems, 1998, pp. P1C-7 to P1C-58.

Durand, Alain, *Deploying Ipv6,* IEEE Internet Computing, http://computer.org/internet, Jan.-Feb. 2001, pp. 79-81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14-18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP-Based IP Telephony System, *IEEE Communications Magazine,* vol. 37, No. 7, Jul. 1999, pp. 96-101. (8 total pages).

Handley/Schulzrinne/Schooler/Rosenberg, SIP: Session Initiation Protocol, Internet Engineering Task Force, draft-ietf-sip-rfc2543bis-02.ps. Sep. 4, 2000. (131 pages).

Borella, M., Lo, J., Grabelsky, D., Montenegro, G., IETF Proceedings presentation, Realm Specific IP: Protocol Specification <draft-nat-rsip-protocol-00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1-3.

Borella, M., Lo, J., Grabelsky, D., Mentenegro, G., Internet Engineering Task Force, Internet Draft, "Realm Specific IP: Framework <draft-ietf-nat-rsip-framework-.04.txt>", Mar. 2000, pp. 1-30.

IETF Mar. 1999 Proceedings, 2.7.10 Network Address Translators (nat), pp. 1-13.

Rosenberg, Jonathan D. and Shockey, Richard, The Session Initiation Protocol (SIP): A Key Component for Internet Telephony, Computer Telephony.com, Jun. 2000, pp. 124-139.

Fenner, W., *Internet Group Management Protocol Version 2,* RFC 2236, Nov. 1997, pp. 1-24.

Mogul, J. et al., *"Internet Standard Subnetting Procedure",* RFC 950, Aug., 1985, pp. 1-18.

Schulzrinne et al., *"RTP: A Transport Protocol for Real-Time Applications",* RFC 1889, pp. 1-75.

Privat, Jermone, *"Double Phase DHCP Configuration",* <draft-privat-dhc-doublephase-01.txt>, Internet Engineering Task Force, Sep. 1999, pps. 1-4.

Maughan, D. et al., *"Internet Security Association and Key Management Protocol",* RFC 2408, Nov. 1998, pps. 1-86.

Karn, P., *"Photuris Session-Key Management Protocol",* RFC 2522, Mar. 1999, pps. 1-58.

*"Random Number Generators",* Computational Science Education Project, 1991, 1992, 1993, 1994 and 1995.

Foster, Ian, *"10 Random Numbers",* 1995.

Borella, Michael et al., *"Realm Specific IP: Protocol Specification",* <draft-ietf-nat-rsip-protocol-02.txt>, Internet Draft, Aug. 1999, pps. 1-27.

Gilligan, R. et al., *"Transition Mechanisms for IPv6 Hosts and Routers",* RFC 1933, Apr. 1996, pps. 1-22.

Afifi, H. et al., *"Method for IPv4-IPv6 Transition",* Proceedings IEEE International Symposium on Computers and Communications, Jul. 6-8, 1999, pps. 478-484.

\* cited by examiner

NEXT SERVER OPTION 300

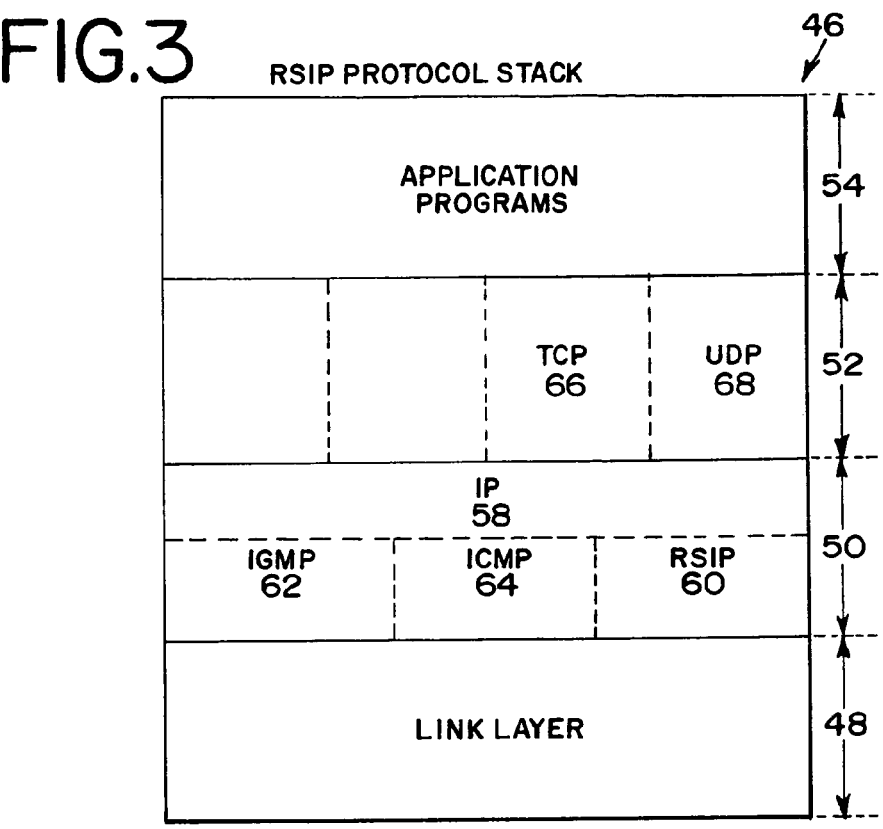
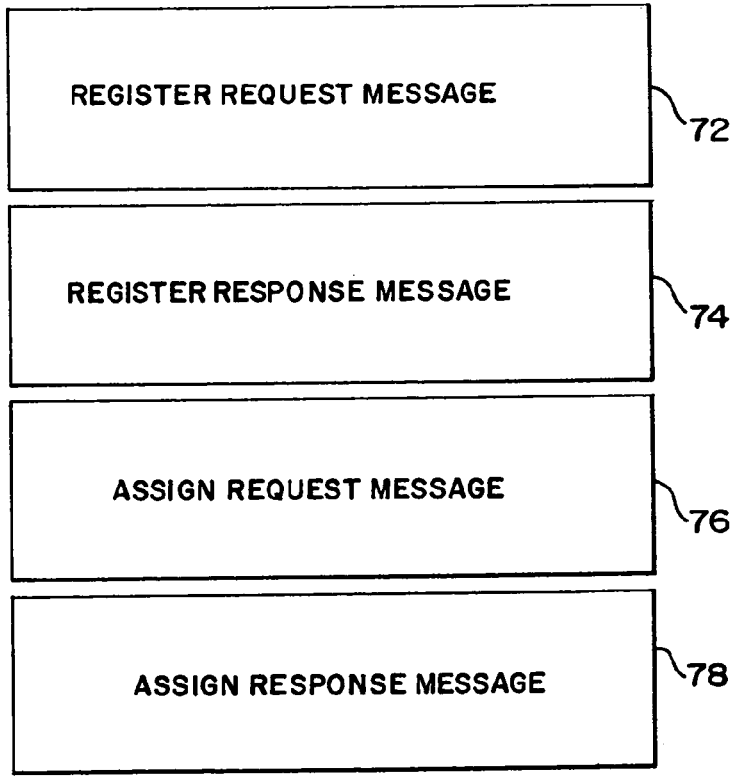

RSIP PROTOCOL MESSAGE HEADER 80 LAYOUT

4 BYTES

REGISTER REQUEST MESSAGE LAYOUT

4 BYTES

FIG.7

REGISTER RESPONSE MESSAGE 74 LAYOUT

| VERSION 83 | TYPE 84 | OVERALL LENGTH 85 | | HEADER 80 |
|---|---|---|---|---|
| CODE 86 | LENGTH 87 | | VALUE 88 | CLIENT ID 90 |
| CLIENT ID VALUE (CONT'D) | | | CODE 86 | FLOW POLICY 92 |
| LENGTH 87 | | LOCAL 150 | REMOTE 152 | |
| CODE 86 | LENGTH 87 | VALUE 88 | | RSIP METHOD 94 |
| CODE 86 | LENGTH 87 | VALUE 88 | | TUNNEL TYPE 96 |

4 BYTES

FIG.8

ASSIGN REQUEST MESSAGE 76 LAYOUT

| VERSION 83 | TYPE 84 | LENGTH 85 | | HEADER 80 |
|---|---|---|---|---|
| CODE 86 | LENGTH 87 | | VALUE 88 | CLIENT ID 90 |
| CLIENT ID VALUE(CONT'D) | | | CODE 86 | LOCAL ADDRESS 100 |
| LENGTH 87 | | TYPE 156 | | |
| VARIABLE LENGTH VALUE 158 | | | | |
| METHOD DEPENDENT FIELDS 154 | | | | |

4 BYTES

FIG. 9

ASSIGN REQUEST MESSAGE 76 METHOD DEPENDENT FIELDS FOR RSA-IP

| CODE 86 | LENGTH 87 | TYPE 156 | REMOTE ADDRESS 102 |
|---|---|---|---|
| VARIABLE LENGTH VALUE 158 | | | |
| CODE 86 | LENGTH 87 | NUMBER 160 | REMOTE PORTS 43 |
| VARIABLE NUMBER OF 2 BYTE PORT FIELDS 162 | | | |
| CODE 86 | LENGTH 87 | VALUE 88 | [LEASE TIME] 106 |
| LEASE TIME VALUE CONT'D | | CODE 86 | [TUNNEL TYPE] 96 |
| LENGTH 87 | VALUE 88 | | |

4 BYTES

FIG. 10

ASSIGN REQUEST MESSAGE 76 METHOD DEPENDENT FIELDS FOR RSAP-IP

| CODE 86 | LENGTH 87 | NUMBER 160 | LOCAL PORTS 42 |
|---|---|---|---|
| VARIABLE NUMBER OF 2 BYTE PORT FIELDS 162 | | | |
| CODE 86 | LENGTH 87 | TYPE 156 | REMOTE ADDRESS 102 |
| VARIABLE LENGTH VALUE 158 | | | |
| CODE 86 | LENGTH 87 | NUMBER 160 | REMOTE PORTS 43 |
| VARIABLE NUMBER OF 2 BYTE PORT FIELDS 162 | | | |
| CODE 86 | LENGTH 87 | VALUE 88 | [LEASE TIME] 106 |
| LEASE TIME VALUE CONT'D | | CODE 86 | [TUNNEL TYPE] 96 |
| LENGTH 87 | VALUE 88 | | |

4 BYTES

FIG. 11

ASSIGN RESPONSE MESSAGE 78 LAYOUT

| VERSION 83 | TYPE 84 | LENGTH 85 | | HEADER 80 |
|---|---|---|---|---|
| CODE 86 | LENGTH 87 | | VALUE 88 | CLIENT ID 90 |
| CLIENT ID VALUE (CONT'D) | | | CODE 86 | BIND ID 110 |
| LENGTH 87 | | VALUE 88 | | |
| BIND ID VALUE CONT'D | | CODE 86 | LENGTH 87 | LOCAL ADDRESS 100 |
| LENGTH CONT'D | TYPE 156 | VARIABLE LENGTH VALUE 158 | | |
| METHOD DEPENDENT FIELDS 154 | | | | |

4 BYTES

FIG. 12

ASSIGN RESPONSE MESSAGE 78 METHOD DEPENDENT FIELDS FOR RSA-IP

| CODE 86 | LENGTH 87 | TYPE 156 | REMOTE ADDRESS 102 |
|---|---|---|---|
| VARIABLE LENGTH VALUE 158 | | | |
| CODE 86 | LENGTH 87 | NUMBER 160 | REMOTE PORTS 43 |
| VARIABLE NUMBER OF 2 BYTE PORT FIELDS 162 | | | |
| CODE 86 | LENGTH 87 | VALUE 88 | LEASE TIME 106 |
| LEASE TIME VALUE CONT'D | | CODE 86 | TUNNEL TYPE 96 |
| LENGTH 87 | VALUE 88 | | |

4 BYTES

FIG. 13

ASSIGN RESPONSE MESSAGE 78 METHOD DEPENDENT FIELDS FOR RSAP-IP

| CODE 86 | LENGTH 87 | NUMBER 160 | LOCAL PORTS 42 |
|---|---|---|---|
| VARIABLE NUMBER OF 2 BYTE PORT FIELDS 162 | | | |
| CODE 86 | LENGTH 87 | TYPE 156 | REMOTE ADDRESS 102 |
| VARIABLE LENGTH VALUE 158 | | | |
| CODE 86 | LENGTH 87 | NUMBER 160 | REMOTE PORTS 43 |
| VARIABLE NUMBER OF 2 BYTE PORT FIELDS 162 | | | |
| CODE 86 | LENGTH 87 | VALUE 88 | LEASE TIME 106 |
| LEASE TIME VALUE CONT'D | | CODE 86 | TUNNEL TYPE 96 |
| LENGTH 87 | VALUE 88 | | |

4 BYTES

18 COMBINATION NETWORK ADDRESS 32

| EXTERNAL NETWORK ADDRESS (E.G., EXTERNAL IP ADDRESS) | LOCALLY UNIQUE PORT |
|---|---|
| 198.10.20.30 | 1032 |

| 126 | 128 | 130 |
|---|---|---|
| INTERNAL NETWORK ADDRESS | LOWEST PORT | NUMBER OF PORTS |
| 10.0.0.1 | 1026 | 32 |
| 10.0.0.3 | 1057 | 16 |

PORT-TO-INTERNAL-NETWORK ADDRESS TABLE

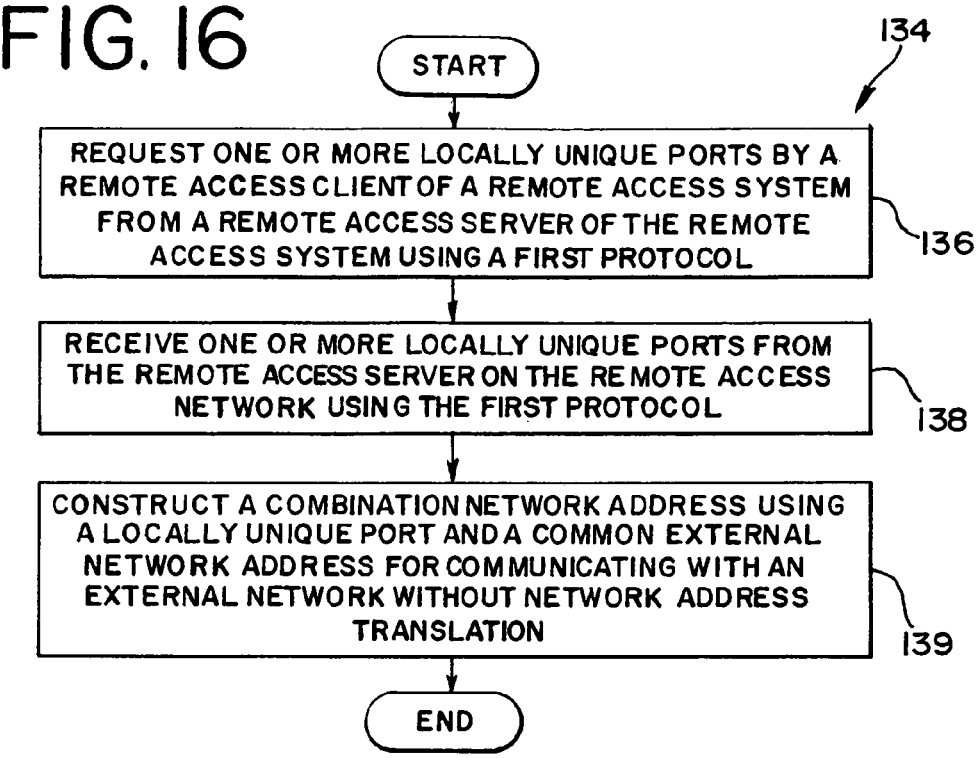
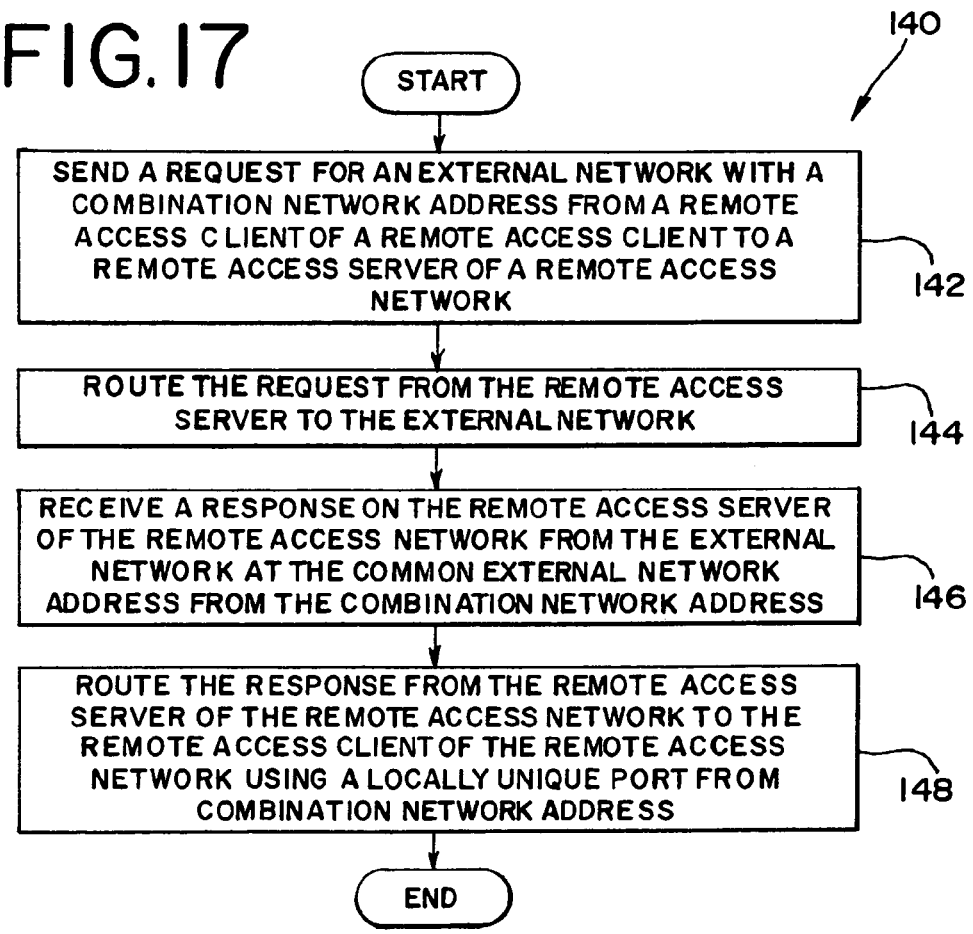

METHOD FOR SUPPORTING SECONDARY ADDRESS DELIVERY ON REMOTE ACCESS SERVERS

RELATED APPLICATIONS

This application claims the benefit of U.S. Provisional Application No. 60/169,534, filed Dec. 7, 1999.

BACKGROUND OF THE INVENTION

A. Field of the Invention

The present invention is related to a method for delivering a public network address of a secondary address server to a dial-up remote access client. In particular, the invention relates to a method for using Internet Protocol Control Protocol to assign public Internet protocol addresses from a secondary address server to a Realm Specific Internet Protocol (RSIP) aware remote access client having a private IP address.

B. Description of the Related Art

As the Internet has experienced explosive growth in recent years, the number of unallocated unique public IP addresses has dwindled. This lack of addresses poses a problem for networks that have only private IP addresses that are unusable outside the network, e.g. companies using an intranet that requires that the internal addresses be kept private. If such a user desires Internet connectivity, the user must either renumber his devices or find a way to use existing public addresses. One approach to solving this problem is to use Network Address Translation (NAT) when connecting to the Internet. See P. Srisureh, "IP Network Address Translator (NAT) Terminology and Considerations," IETF RFC 2663, August 1999, which is incorporated herein by reference.

NAT provides a method for transparent bi-directional communication between a private routing realm, for example a private intranet, and an external routing realm, for example, the Internet. Through use of NAT, addresses of packets sent by the first realm are translated into addresses associated with the second realm. Use of private IP addresses in conjunction with an NAT implementation in the router card for an ISP would therefore allow the ISP to conserve globally-routable public IP addresses.

The use of private IP addresses in conjunction with an NAT, however, presents problems in several applications. In applications that transmit IP addresses in packet payloads, NAT requires an application layer gateway to function properly. Problems with NAT support for end-to-end protocols, especially those that authenticate or encrypt portions of data packets, are also particularly well-known. See, e.g., Holdrege et al., "Protocol Complications with the IP Network Address Translator," Internet Draft <draft-ietf-nat-protocol-complications-01>, June 1999. NAT also creates difficulties when applied to Internet security applications.

As an alternative, RSIP has been proposed at a replacement for NAT. See M. Borella. et al., "Realm Specific IP: Protocol Specification," Internet Draft <draft-ietf-nat-rsip-protocol-07>, July 2000, which is incorporated herein by reference. Using RSIP, a client and server (e.g., a dialup client and an RSIP server, which may be part of a router card or a standalone device) negotiate the use of a public IP address and possibly some number of Transmission Control Protocol (TCP)/User Datagram Protocol (UDP) ports. After enabling RSIP in the ISP and on clients, the RSIP-aware clients can share one or more IP addresses instead of each requiring a dedicated address.

RSIP requires that an application on the client communicate with an application on the RSIP server, so the communication link must be configured for IP before this communication occurs. The RSIP client must also know the IP address of the RSIP server, so that it can contact the server directly. Thus, there is a need in the art for a method by which an RSIP client can determine the IP address of an RSIP server. There is also a need in the art for a process by which a dial-up client and a set of ISP equipment may use RSIP to assign IP addresses from the ISP equipment to the dial-up client in order to conserve globally-routable IP addresses.

SUMMARY OF THE INVENTION

The present invention provides a method for delivering a globally unique IP address from a remote access device on a remote access network to a dial-up remote client for use in communicating with a second network. In a preferred embodiment, the method comprises a next server option, wherein an IPCP packet containing a server address is sent from a remote access server to a client, and wherein if the client recognizes the packet, then the client negotiates a lease of a public IP address from the RSIP server. If the client does not recognize the packet, then the client uses NAT with its assigned private IP address.

In a further preferred embodiment, the IPCP packet comprises a type field, a length field, a server type field, an address type field, and an address field.

These and other features and advantages of the present invention will become more apparent from the following detailed description of preferred embodiments of the present invention.

BRIEF DESCRIPTION OF THE DRAWINGS

Presently preferred embodiments of the invention are described with reference to the following drawings, wherein:

FIG. 3 is a block diagram illustrating a protocol stack for a network device;

FIG. 4 is a block diagram illustrating a the realm specific Internet protocol messages;

FIG. 7 is a block diagram illustrating a register response message layout;

FIG. 8 is a block diagram illustrating an assign request message layout;

FIG. 9 is a block diagram illustrating an assign request message layout when the RSIP type is RSA-IP;

FIG. 10 is a block diagram illustrating an assign request message layout when the RSIP type is RSAP-IP;

FIG. 11 is a block diagram illustrating an assign response message layout;

FIG. 12 is a block diagram illustrating an assign response message layout when the RSIP type is RSA-IP;

FIG. 13 is a block diagram illustrating an assign response message layout when the RSIP type is RSAP-IP;

FIG. 14 is a block diagram illustrating a combined network address;

FIG. 15 is a block diagram illustrating a port-to-internal address table;

FIG. 16 is a flow diagram illustrating a method for creating a combination network address; and FIG. 17 is a flow diagram illustrating a method for implementing RSIP in the network access server.

DETAILED DESCRIPTION OF THE PRESENTLY PREFERRED EMBODIMENTS

The invention broadly comprises a method for assigning a globally-routable IP address from a network device on a remote access system to a remote access client for use in communicating with a plurality of network devices on a second network. The preferred embodiments of the present invention and its advantages over the related art are best understood by reference to FIGS. 1–17 and the following description.

Figure 1:
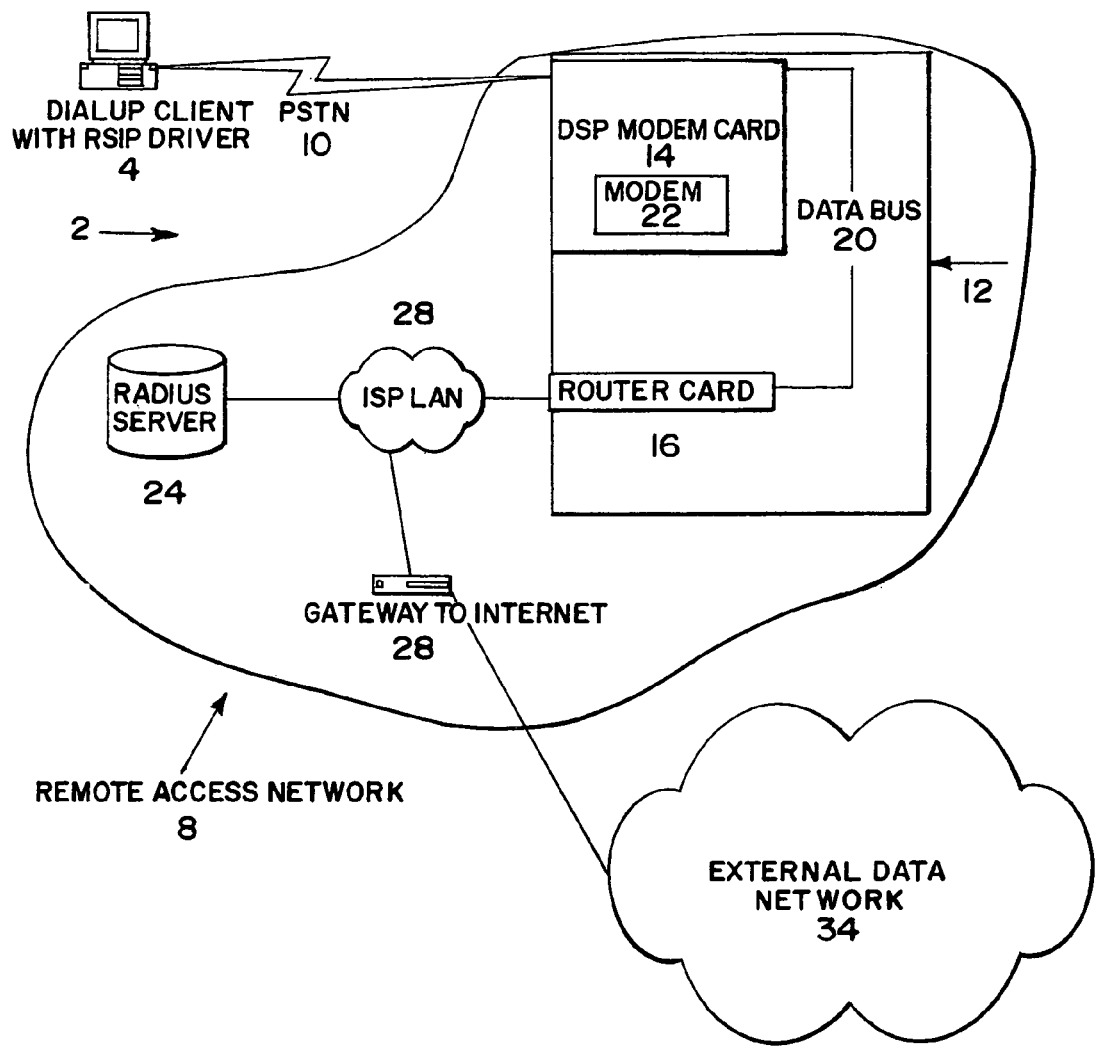
FIG. 1 is a simplified high level diagram illustrating a remote access system.

Remote access systems (RASs) are commonly used for dial-up access to the Internet and other IP networks. FIG. 1 illustrates a typical hardware configuration for a remote access system 2. An RAS client 4 uses a modem to dial a remote access network 8 over the Public Switched Telephone Network (PSTN) 10. In a preferred embodiment, RAS client 4 is a personal computer (PC) in a user's residence and the remote access network 8 is an Internet Service Provider (ISP). The call is routed by the PSTN 10 to the remote access network 8, and is answered in a RAS server 12. In a preferred embodiment, the RAS server 12 comprises one or more digital signal processing (DSP) cards 14 and a router card 16 having a pool of public IP addresses that may be assigned to the RAS client 4, wherein the router card 16 is connected to the DSP cards 14 via a high-speed data bus 20. In a further preferred embodiment, each DSP card 14 comprises one or more modems.

In a preferred embodiment, remote access network 8 comprises more than one RAS server 12. In this embodiment, remote access network 8 further comprises a Remote Authentication Dial-In User Service (RADIUS) server 24 having a pool of public IP addresses that may be assigned to the RAS client 4 through the RAS server 12. The remote access network 8 connects the RAS servers 12, the RADIUS server 24, and a gateway 26 to an external data network 34, such as the Internet or another intranet, on a local area network (LAN) 28.

The preferred embodiments of remote access system 2 may include additional sub-components and elements. It should also be understood that the external networks shown in the figure need not be separate networks; nor is there any implied limitation on the number of external networks.

As used herein, the term "layer" is defined by reference to the Open System Interconnection (OSI) Reference Model. Specifically, as used in the application, layer one is a physical layer, layer two is a data link layer, and layer three is a network layer. However, the invention is not limited to this layer numbering of the OSI model.

As used herein, the term "RSIP client" refers to an application that runs the client side of the RSIP protocol.

As used herein, the term "RSIP host" refers to the physical device where the RSIP client application resides. Referring to FIG. 1, the RSIP host corresponds to the RAS client 4.

As used herein, the term "RSIP server" refers to an application that runs the server side of the RSIP protocol.

As used herein, the term "RSIP gateway" refers to the physical device where the RSIP server application resides. Referring to FIG. 1, the RSIP gateway corresponds to the remote access server 12.

An operating environment for network devices and routers of the present invention includes a processing system with at least one high speed Central Processing Unit ("CPU") and a memory. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed."

It will be appreciated that acts and symbolically represented operations include the manipulation of electrical signals by the CPU. The memory locations where data bits are maintained are physical locations that have particular electrical, magnetic, optical, or organic properties corresponding to the data bits.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In network address translation schemes known in the prior art, RAS server 12 translates a private address of the RAS client 4 to an external network address, such as an IP address for outgoing traffic to an external IP data network 34. The RAS server 12 also translates the external network address to the private network address for incoming traffic from the external IP data network 34. A NAT router assumes the entire computational burden for network address translation. For large dial-up remote access networks 8 having 50 or more RAS clients 4, the NAT router may become a bottleneck. In the worst case, every packet passing through the NAT router requires address translation.

In an illustrative embodiment of the present invention, Realm Specific Internet Protocol ("RSIP") is used to overcome the difficulties associated with NAT. In a preferred embodiment of the invention, a dialup remote access client 4 requests a globally unique public network address 18 and one or more locally unique ports 32 from a remote access server 12 on a remote access network 8 for external communications with a second network 34, such as the Internet. The remote access server 12 on the remote access network 8 then creates a combination network address 112 comprising the globally unique public network address 18 and the locally unique ports 32, to identify information transmitted to and from the remote access client 4.

Enabling RSIP-Aware RAS Client to Use RSIP

The dial-up sequence of the invention operates as follows. The RAS client 4 dials the remote access network's 8 phone number. The call is routed over the PSTN 10 to a particular modem on one of the RAS server 12 DSP cards 14. The modem answers the call and performs a physical-layer negotiation with the RAS client 4 in order to determine an appropriate data rate and modulation scheme. Once the physical-layer is configured, Point-to-Point Protocol (hereinafter PPP) framing is used as the data-link layer to encapsulate all layer-three (IP) traffic. See W. Simpson, "The Point-to-Point Protocol (PPP) for the Transmission of Multi-Protocol Datagrams over Point-to-Point Links," IETF RFC 1331, May 1992, which is incorporated herein by reference.

The PPP framing process includes three steps. First, Link Control Protocol (see RFC1331) negotiation is used to configure the data link layer and to determine the layer-three protocol that will be encapsulated. Second, an optional user authentication is performed, typically using an authentication protocol such as Challenge-Handshake Authentication Protocol (CHAP) or Password Authentication Protocol (PAP). See B. Lloyd et al., "PPP Authentication Protocols," IETF RFC 1334, October 1992, which is incorporated herein by reference. Third, a layer-three specific Network Control Protocol (NCP) is used to configure the chosen layer-three protocol. In the case of IP 58, NCP is IPCP. See G. McGregor, "The PPP Internet Protocol Control Protocol (IPCP)," IETF RFC 1332, May 1992, which is incorporated herein by reference. IPCP allows the assignment of a private IP address from the RAS server 12 to the RAS client 4 or a suggestion of a private IP address by the RAS client 4 to the RAS server 12 that the RAS client 4 would like to use. In most configurations, the private IP address is assigned to the RAS client 4 by the RAS server 12. Once the private IP address is assigned to the RAS client 4, the RAS client 4 may communicate with the remote access network 8 using the assigned private IP address.

The RAS server 12 has a number of options for assigning a private IP address to the RAS client 4, as well as for the type of address it assigns. The router card 16 of the RAS server 12 may store a pool of locally unique private IP addresses, from which it can choose one to assign to each RAS client 4. In the case of more than one RAS server 12 in the same remote access network 8 point of presence (POP), the remote access network further comprises a RADIUS server 24 that stores the private IP address pool, and the router card 16 must communicate with the RADIUS server 24 in order to determine a private IP address to assign the RAS client 4. This process typically occurs during user authentication, which is also performed with the assistance of the RADIUS server. See Y. Rekhter et al., "Address Allocation for Private Internets," IETF RFC 1918, February 1996, which is incorporated herein by reference.

Figure 2:
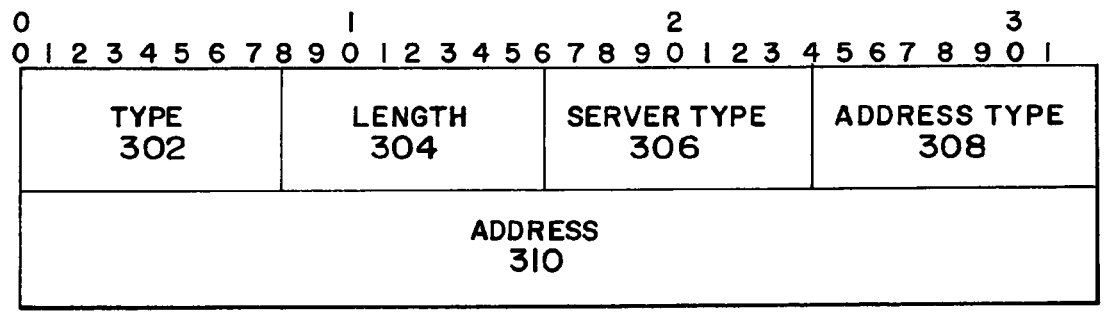
FIG. 2 is a diagram of an IPCP extension used in this embodiment.

An IPCP next server option is used to transmit the globally unique IP address 18 from the RAS server 12 to the RAS client 4. As shown in FIG. 2, in a preferred embodiment, a next server option 300 comprises a type field 302, a length field 304, a server type field 306, an address type field 308, and an address field 310. The type field 302 entry will be specified by the Internet Assigned Numbers Authority (IANA) when the RSIP option is standardized. The value of the length field 304 is preferably at least 8, and depends on the address type. The server type 306 value is 1 for RSIP servers. The address type 308 value is 1 for IP version 4 (IPv4, see F. Baker, "Requirements for IP Version 4 Routers," IETF RFC 1812, June 1995, which is incorporated herein by reference) or 2 for IP version 6 (IPv6, see S. Bradner et al., "The Recommendation for the IP Next Generation Protocol," IETF RFC 1752, January 1995, which is incorporated herein by reference). The address field 310 is 4 bytes for IPv4 addresses and 16 bytes for IPv6 addresses.

The IPCP Next Server option informs the RAS client 4 of a locally unique IP address of an RSIP-enabled RAS server 12, by transmitting next server option 300 to the RAS client 4. If the RAS client 4 is not RSIP-aware, the RAS client 4 rejects or ignores the option and the RAS server 12 uses NAT with the assigned private IP address of the RAS client 4 for processing information transmitted from the RAS client 4 to the second network 34 and from the second network 34 to the RAS client 4. If the RAS client 4 is RSIP-aware, and chooses to use RSIP, the RAS client 4 contacts the specified RSIP-enabled RAS server 12 using the locally unique private IP address contained in the next server option 300 and negotiates the lease of a public IP address 18 and one or more locally unique TCP/UDP ports 32 as well, as described below.

RSIP Protocol Stack

FIG. 3 is a block diagram illustrating a layered protocol stack 46 for the RAS client 4. Layered protocol stack 46 is described with respect to Internet Protocol suites comprising from lowest-to-highest, a link layer 48, a network layer 50, a transport layer 52 and an application layer 54. However, more or fewer layers could also be used, and different layer designations could also be used for the layers in the protocol stack 46 (e.g., layering based on the Open Systems Interconnection ("OSI") model).

The network layer 50 includes an IP layer 58 (hereinafter "IP 58"), which preferably includes an Internet Group Management Protocol ("IGMP") layer 62 and a Control Message Protocol ("ICMP") layer 64. IP layer 58 may also encapsulate transport layer 52. As is known in the art, IP 58 is an addressing protocol designed to route traffic within a network or between networks. IP 58 is described in RFC-791, incorporated herein by reference. Above network layer 50 is a transport layer 52. The transport layer 52 preferably includes a Transmission Control Protocol ("TCP") layer 66 and a User Datagram Protocol 10, ("UDP") layer 68. However, more or fewer protocols could also be used.

The RAS server 12 allocates a globally unique network address 18 and one or more locally unique ports 32 to a remote access client 4 having an RSIP layer 60. In one embodiment of the present invention, as shown in FIG. 3, the RSIP layer 60 is preferably a separate protocol layer in network layer 50. In another embodiment of the present invention, the RSIP layer 60 is implemented as part of the ICMP layer 64 and is not a separate protocol layer. In yet another embodiment of the present invention, RSIP layer 60 is run over either a Transmission Control Protocol or User Datagram Protocol. The RSIP layer 60 is explained in greater detail below. In a further embodiment, the RSIP layer 60 may be part of an application.

The IGMP layer 62, hereinafter IGMP 62, is responsible for multicasting. For more information on IGMP 62, see RFC-1112, incorporated herein by reference.

The ICMP layer 64, hereinafter ICMP 64, is used for Internet Protocol control. The main functions of the ICMP 64 include error reporting, reachability testing (e.g., "pinging"), route-change notification, performance, subnet addressing and other maintenance. For more information on the ICMP 64, see RFC-792, incorporated herein by reference.

The TCP layer 66, hereinafter TCP 66, provides a connection-oriented, end-to-end reliable protocol designed to fit into a layered hierarchy of protocols which support multi-network applications. The TCP 66 provides for reliable inter-process communication between pairs of processes in network devices attached to distinct but interconnected networks. For more information on the TCP 66 see RFC-793, incorporated herein by reference.

The UDP layer 68, hereinafter UDP 68, provides a connectionless mode of communications with datagrams in an interconnected set of computer networks. The UDP 68 provides a transaction oriented datagram protocol, where delivery and duplicate packet protection are not guaranteed. For more information on the UDP 68 see RFC-768, incorporated herein by reference. Both the TCP 66 and the UDP 68 are not required in protocol stack 46; either TCP 66 or UDP 68 can be used without the other.

Above the transport layer 52 is an application layer 54 where application programs to carry out desired functionality for a network device reside.

More or fewer protocol layers can also be used in the protocol stack 46.

RSIP Protocol

FIG. 4 is a block diagram illustrating an embodiment of a RSIP protocol stack 70. The RSIP protocol stack 70 includes a register request message 72, a register response message 74, an assign request message 76 and an assign response message 78. The RSIP protocol stack 70 messages are in type-length-value ("TLV") format. Additional messages could also be used for RSIP protocol messages, as described in M. Borella et al., "Realm Specific IP: Protocol Specification," Internet Draft <draft-ietf-nat-rsip-protocol-07>, July 2000 (hereinafter "RSIP-PROTOCOL").

Figure 5:
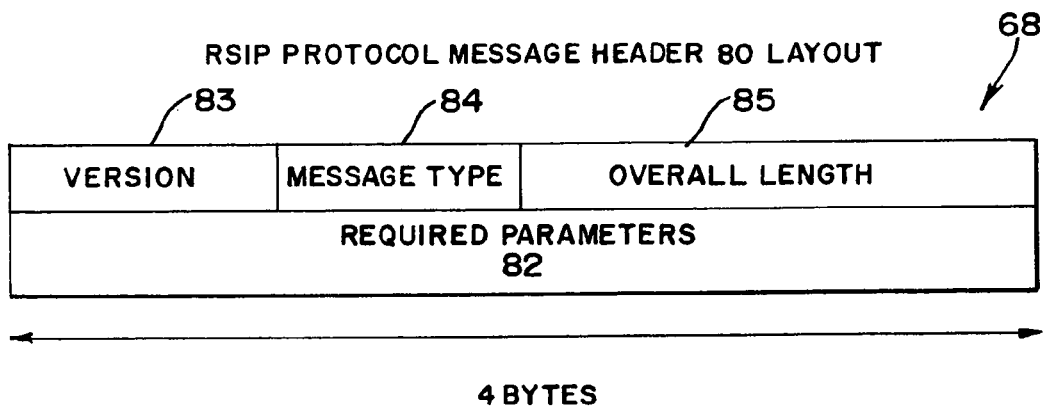
FIG. 5 is a block diagram illustrating a realm specific Internet message layout.

As shown in FIG. 5, each RSIP protocol message 68 comprises a header including three mandatory fields followed by one or more required parameters 82. The mandatory fields comprise a version field 83, a message type field 84, and an overall length field 85. The version field 83 is one byte and indicates the version of RSIP being used. The message type field 84 is one byte and indicates the specific message, e.g. a value of 2 indicates register request message 72, 3 indicates register response message 74, etc. The overall length field 85 is two bytes and indicates the length of the entire message, including the header. The required parameters 82 each comprise a one byte code field 86, a two byte length field 87, and a variable length value field 88. The length field 87 specifies the length of the value field 88 only.

Figure 6:
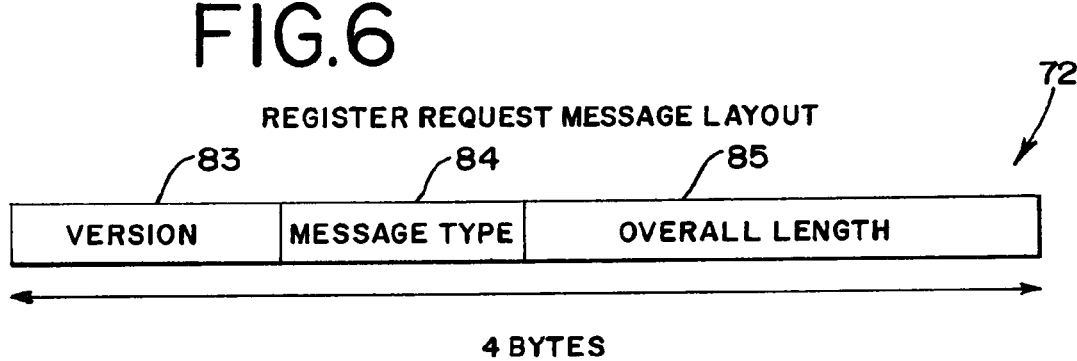
FIG. 6 is a block diagram illustrating a register request message layout.

In a illustrative embodiment of the present invention, the register request message 72 is sent from the RAS client 4 to the RAS server 12 to request a globally unique IP address 18 and a block of locally unique ports 32. FIG. 6 is a block diagram illustrating a register request message 72 layout, which comprises a header.

In one embodiment of the present invention, the RAS client 4 transmits the register request message 72 upon boot. In another embodiment of the present invention, the RAS client 4 requests a globally unique IP address 18 and one or more locally unique ports 32 after boot when a protocol layer in layered protocol stack 46 makes an initial request for a second network 34. The RAS client 4 may also request a globally unique address 18 and one or more locally unique ports 32 when the number of globally unique addresses 18 and locally unique ports 32 required falls below the number of globally unique addresses and ports allocated.

A register response message 74 is sent from the RAS server 12 back to the RAS client 4 either confirming or denying the register request message 72. FIG. 7 is a block diagram illustrating a register response message 74 layout. The register response message 74 comprises a header 80 followed by the required parameters client ID 90 and flow policy 92. The register response message 74 may also include optional parameters for the RSIP type 94 and the tunnel type 96. The client ID parameter 90 has a code field 86 value of 4 and a length of four bytes.

The flow policy parameter 92 has a code field 86 value of 9 and a length of two bytes, the first byte of which specifies the local flow policy 150 and the second byte of which specifies the remote flow policy 152. Flow policies are described in greater detail in RSIP-PROTOCOL.

The optional RSIP type parameter 94 has a code field 86 value of 7 and a length of one byte. This byte specifies whether Realm Specific Address IP (RSA-IP) or Realm Specific Address and Port IP (RSAP-IP) will be used. In RSA-IP, the RAS server 12 allocates each RAS client 4 a globally unique public IP address 18. In RSAP-IP, the RAS server 12 allocates each RAS client 4 a globally unique public IP address 18 and a number of locally unique ports 32.

The optional tunnel type parameter 96 has a code field 86 value of 6 and a length of one byte. Possible tunnel types specified by this parameter include IP—IP (value of 1), GRE (value of 2), and L2TP (value of 3).

Upon receiving a successful register response message 74, the RAS client 4 sends an assign request message 76 to the RAS server 12. FIG. 8 is a block diagram illustrating an embodiment of an assign request message 76 layout. The assign request message 76 comprises a header 80 followed by the required parameters client ID 90 and address and port parameters. The address and port parameters include a local address 100 and a number of method dependent fields 154. As shown in FIG. 9, if the system is using RSA-IP, the address and port parameters comprise mandatory parameters for the local address 100, the remote address 102, and the remote ports 43, and optional parameters for the lease time 106 and the tunnel type 96. As shown in FIG. 10, if the system is using RSAP-IP, the address and port parameters comprise mandatory parameters for the local address 100, the local ports 42, the remote address 102, and the remote ports 43, and optional parameters for lease time 106 and tunnel type 96.

The address parameters 100 and 102 have a one byte code field 86 with a value of 1 and a two byte length field 87 that specifies the remaining length of the message. The first byte of the length is a type field 156 and the remaining length is a value field 158. The length of the overall value field 88 depends on the type of address selected.

The port parameters 42 and 43 have a one byte code field 86 with a value of 2 and a two byte length field 87 that specifies the remaining length of the message. The first byte of the length is a one byte number field 160 that specifies the number of ports. The remaining length consists of one or more two byte port fields 162 that specify the ports to be allocated.

The lease time parameter 106 has a one byte code field 86 with a value of 3 and a four byte length field 87 that specifies the remaining length of the message. The value in the remaining length specifies the amount of time that the binding will remain active.

The assign response message 78 is sent from the RAS server 12 back to the RAS client 4 with a globally unique public IP address 18 and one or more locally unique ports 32 for use by the RAS client 4. FIG. 11 is a block diagram illustrating an embodiment of an assign response message 78 layout. The assign response message 78 comprises header 80 followed by the required parameters client ID 90, bind ID 110, and address and port parameters. The address and port parameters include a local address 100 and a number of method dependent fields 154. As shown in FIG. 12, if the system is using RSA-IP, the address and port parameters comprise mandatory parameters for the local address 100, the remote address 102, the remote ports 43, the lease time 106 and the tunnel type 96. As shown in FIG. 13, if the system is using RSAP-IP, the address and port parameters comprise mandatory parameters for the local address 100, the local ports 42, the remote address 102, the remote ports 43, the lease time 106 and the tunnel type 96. Note that the lease time and tunnel type parameters are mandatory in the assign response message 78, while they are optional in the assign request message 76.

Once the RAS server 12 assigns a globally unique public IP address 18 and one or more locally unique ports 32 to RAS client 4, the RAS client 4 saves the block of locally unique ports 32 that it may use. The one or more locally unique ports 32 are allocated to protocols and applications in the layered protocol stack 46 on the RAS client 4 to replace local or default ports. If no addresses are available, the RAS server 12 returns an error message to the RAS client 4. The locally unique ports 32 are saved in a data structure with a flag-field indicating whether each locally unique port 32 is allocated or unused. Table 1 is pseudo-code for an exemplary data structure to store locally unique port 32 information. However, other data structures or layouts could also be used.

TABLE 1

```
struct locally_unique_ports
{
    int port_number;
    flag status: 1; /* one bit flag, 0 = unused, 1 = allocated */
} gu_ports[MAX_GU];
int number_of_gu_ports; /* number of locally unique ports allocated */
```

The one or more locally unique ports 32 are allocated to protocols and applications in the layered protocol stack 46 on the remote access client 4. Upon receiving an unsuccessful assign response message 78, the remote access client 4 may send another assign request message 76 for fewer ports 32. If the RAS server 12 cannot allocate a large enough block of contiguous locally unique ports 32 for the remote access client 4, it may send an assign response message 78 with a success code, but allocate fewer locally unique ports 32 than requested.

In an illustrative embodiment of the present invention, the RAS server 12 allocates blocks of locally unique ports 32 to remote access client 4. However, other remote access network devices could also be used to allocate locally unique ports 32 (e.g., a port server).

FIG. 14 is a block diagram illustrating a layout for a combined network address 112. The combined network address layout 112 preferably includes a common external network address 18, such as an IP address, and a locally unique port 32 obtained by sending an assign request message 76 to and receiving an assign response message 78 from the RAS server 12. However, other layouts could also be used. Remote access clients 4 use the combined network address 112 for communications with the second computer network 34. The common external network address 18 identifies the remote access network 8 to the second computer network 34.

As is known in the art, to identify separate data streams, the TCP 66 provides a source port field and a source address field in a TCP header. For more information on TCP headers see RFC-793. Since local or default port identifiers are selected independently by each TCP 66 stack in a network, they are typically not unique. To provide for unique addresses within each TCP 66, a local Internet address identifying the TCP 66 can be concatenated with a local port identifier and a remote Internet address and a remote port identifier to create a "socket" that will be unique throughout all networks connected together. Sockets are known to those skilled in the networking arts.

In an illustrative embodiment of the present invention, the source port in a TCP header is given a locally unique port 32 obtained with RSIP protocol stack 70 and given a common external network address 18. Together they uniquely identify applications and protocols on remote access clients 4 on the remote access network 8 to a second external computer network 34 with a value conceptually similar to the socket used by the TCP 66.

As is also known in the art, the UDP 68 also has a source port field in a UDP header. For more information on UDP headers, see RFC-768. The UDP source port field is an optional field; when used, it indicates a port of the sending process, and may be assumed to be the port to which a reply should be addressed in the absence of any other information. A UDP header also has a source address field. A locally unique port can also be used in a UDP header.

In an illustrative embodiment of the present invention, the RSIP protocol stack 70 is used to create the combination network address 112 that is used in the TCP header and the UDP header fields. In another embodiment of the present invention, the combination network address 112 is stored in other message header fields understood by the RAS server 12 (i.e., non-IP 58, TCP 66, or UDP 68 fields) and the second computer network 34.

The RAS server 12 maintains a port-to-private network address table 122 as locally unique ports 32 are allocated. The RAS server 12 also maintains an internal table indicating private addresses for all remote access clients 4 on the remote access network 8. In an illustrative embodiment of the present invention, the private addresses of the remote access clients 4 for the remote access network 8 are IP addresses; however, other private addresses could also be used (e.g., a Medium Access Control ("MAC") protocol addresses). For example, a remote access client 4 has an private IP address of 10.0.0.1, while a RAS server 12 has a private IP address of 10.0.0.2. The private IP addresses are not published on the second computer network 14.

FIG. 15 is a block diagram illustrating a port-to-internal address table 122 layout maintained by the RAS server 12. However, other layouts and more or fewer rows and columns could also be used could also be used. The port-to-internal address table 122 layout has three columns: an internal-network-address column 126, a lowest-port column 128, and a number-of-ports column 130. However, more or fewer columns or other table layouts could also be used. The first row indicates that a remote access client 4 has been allocated ports 1–32 for use with private address 10.0.0.1. The RAS server 12 uses ports 100–116 with private address 10.0.0.2. A private address may have several entries in the port-to-internal address table 122.

Realm Specific Internet Protocol

FIG. 16 is a flow diagram illustrating a method 134 for implementing RSIP for a remote access client 4 of a remote access system 2. At step 136, a remote access client 4 requests a common external address 18 and one or more locally unique ports 32 from a RAS server 12 on the remote access network 8 with a first protocol. The locally unique ports 32 are used in protocol layers in layered protocol stack 46 on the remote access client 4. In addition, the locally unique ports 32 are used to create a combination network address 112 comprising a locally unique port 32 and a common external address 18 to communicate with a second computer network 34 without address translation. At step 138, the remote access client 4 receives the common external address 18 and one or more locally unique ports 32 from the RAS server 12. At step 139, the remote access client 4 constructs one or more combination network addresses 112 using the one or more locally unique ports 32 and a common external network address 18 used to identify the remote access network 8 to the second external computer network 34.

In an illustrative embodiment of the present invention, the remote access client 4 is a computer having a modem, the RAS server 12 comprises a digital signal processing card 14 and a router card 16 connected by a high-speed data bus 20, the first protocol is RSIP protocol stack 70, and the second computer network 34 is any of the Internet or an intranet. The combination network address 112 includes a common IP address (e.g., common network address 18) identifying the remote access network 8 to the second computer network 34. However, the present invention is not limited to the networks, network devices, network addresses or protocols described and others may also be used.

The ports 32 are used for entities such as protocols and applications in the layered protocol stack 46 on the remote access client and are locally unique on the remote access network 8. The locally unique ports 32 will identify a remote access client 4 of the remote access system 2. After allocation with method 134, a remote access client 4 uses a locally unique port 32 in a protocol layer in layered protocol stack 46. As is illustrated in FIG. 15, the remote access client 4 with the internal IP address 10.0.0.1 is assigned thirty-two locally unique ports in the range of 1–32. The combination network address 112 illustrated in FIG. 14 is then assigned to the TCP 66 on the remote access client 4 for communications with the second computer network 34. Other locally unique ports 32 are assigned to other protocols and applications in layered protocol stack 46 on remote access client 4.

In a preferred embodiment of the present invention, the locally unique ports 32 are assigned to protocol layers in the layered protocol stack 46 when a protocol layer makes a request for the second computer network 34. In yet another embodiment of the present invention, the locally unique ports 32 are assigned dynamically or on-the-fly in an individual protocol layer as a protocol layer makes a request for the second computer network 34.

The locally unique ports 32 with common external network address 18 as combination network address 112 uniquely identify a remote access client 4 to a second computer network 34 without translation.

FIG. 17 is a flow diagram illustrating a method 140 for implementing RSIP. At step 142, a request is sent from a remote access client 4 to a RAS server 12 on the remote access network 8. The request is for a second computer network 34 and includes a combination network address 112 identifying the remote access client 4. The combination network address 112 is constructed with method 134 (FIG. 16) and includes a locally unique port 32 and a common external address 18 to identify the remote access network 8 to the second computer network 34. At step 144, the RAS server 12 routes the request from the remote access client 4 to the second computer network 34. At step 146, the RAS server 12 on the remote access network 8 receives a response from the second computer network 34 at the external network address 18 identifying the remote access network 8 from the combination network address 112. At step 148, the RAS server 12 on the remote access network 8 routes the response to the remote access client 4 using the locally unique port 32 from the combination network address 112.

In an illustrative embodiment of the present invention, the remote access client 4 is a computer having a modem, the RAS server 12 comprises a digital signal processing card 14 and a router card 16 connected by a high speed data bus 20, and the second computer network 34 is any of the Internet or an intranet. The combination network address 112 includes a locally unique port 32 obtained with RSIP protocol stack 70 and an external IP address 18 for a second computer network 34 such as the Internet, an intranet, or another computer network. However, the present invention is not limited to the networks, network devices, network address or protocol described and others may also be used.

Method 140 (FIG. 17) is illustrated with a specific example using TCP 66/IP 58 layers from layered protocol stack 46. However, other protocol layers in layered protocol stack 46 could also be used. At step 142, the remote access client 4 sends a TCP 66 request to the RAS server 12; for example, a TCP 66 request for the RAS server 12 at the external IP address 192.200.20.3 on second computer network 34. Table 2 illustrates an exemplary request data packet sent at step 142.

TABLE 2

| IP 58 Header | TCP 66 Header |
|---|---|
| SRC IP: 198.10.20.30 | SRC Port: 2000 |
| DST IP: 192.200.20.3 | DST Port: 80 |

The source IP address is the common external network address 18 (e.g., 198.10.20.30) and the source port is the locally unique port 2000 obtained via RSIP protocol stack 70 with method 134 and assigned to the TCP 66. In one embodiment of the present invention, the locally unique port 2000 is assigned when a protocol layer in the layered protocol stack 46 makes the request. The locally unique port 32 along with the common external address 18 comprise the combination network address 112. The destination IP address is 192.200.20.3 for the RAS server 12 (FIG. 2) on the second external network 34 and the destination port is well known Internet port 80. When the request reaches the link layer 48, in the layered protocol stack 46, an outer IP header is added to route the request to the RAS server 12. The private network address (e.g., 10.0.0.x) for a remote access client for communications with the remote access network 8 is maintained in the link layer 48. Table 3 illustrates an exemplary data packet with an outer IP header added for the RAS server 12.

TABLE 3

| Outer IP 58 header | Inner IP 58 header | TCP 66 header |
|---|---|---|
| SRC IP: 10.0.0.1 | SRC IP: 198.10.20.30 | SRC Port: 2000 |
| DST IP: 10.0.0.7 | DST IP: 192.200.20.3 | SRC Port: 80 |

The link layer 48 or the network layer 50 adds the outer IP header including a source IP address for the remote access client 4 of 10.0.0.1 and a destination IP address of 10.0.0.7 for the RAS server 12. At step 144, the RAS server 12 receives the request data packet, strips the outer IP header, and sends the request data packet to the second computer network 34.

At step 146, the RAS server 12 receives a response packet from the second computer network 34. An exemplary response data packet is illustrated in Table 4.

TABLE 4

| IP 58 Header | TCP 66 Header |
|---|---|
| SRC IP: 192.200.20.3 | SRC Port: 80 |
| DST IP: 198.10.20.30 | DST Port: 2000 |

The RAS server 12 receives the response packet from the second computer network 34 at step 146 with the destination IP address 198.10.20.30 and destination port set to locally unique port 2000. The RAS server 12 uses port-to-private address table (FIG. 15) to map the destination port 2000 to the private IP address 10.0.0.1 for the remote access client 4. The RAS server 12 adds an outer IP header to route the response data packet back to the remote access client 4. Table 5 illustrates an exemplary response packet with the outer IP header added by the RAS server 12.

TABLE 5

| Outer IP 58 header | Inner IP 58 header | TCP 66 header |
|---|---|---|
| SRC IP: 10.0.0.7 | SRC IP: 192.200.20.3 | SRC Port: 80 |
| DST IP: 10.0.0.1 | DST IP: 198.10.20.30 | SRC Port: 2 |

The outer IP header has a source internal IP address of 10.0.0.7 for the RAS server 12 and a destination internal IP address of 10.0.0.1 for the remote access client 4 on the remote access network 8. At step 148, the RAS server 12 routes the response data packet to the remote access client 4 with the outer IP header. The link layer 48 in the layered protocol stack 46 strips the outer IP header and forwards the response data packet to the network layer 50.

The remote access client 4 sends a request to a second computer network 34 and receives a response from the second computer network 34 using RSIP protocol stack 70 and locally unique port 32 allocated with RSIP protocol stack 70. The RAS server 12 does not translate any source/destination IP addresses or source/destination ports. Thus, RSIP is accomplished without network address translation at the RAS server 12.

An illustrative embodiment of the present invention is described with respect to a single common external network address 18 identifying multiple remote access clients 4 of a remote access system 2 and used in combination network address 112 with a locally unique port 32. However, the present invention is not limited to a single common external network address and can also be practiced with a multiple common external network addresses.

RSIP using method 134 (FIG. 16) and method 140 (FIG. 17) removes the computational burden of NAT at the RAS server 12 and allows multiple remote access clients 4 to use a single or a small number of external network addresses 18 known to a second computer network 34 such as the Internet or an intranet. Instead of providing NAT, the RAS server 12 routes data packets from a remote access client 4 of the remote access system 2 to a second computer network 34 using the combination network address 112. In addition, the RAS server 12 is no longer required to support multiple application protocols from layered protocol stack 46.

The RAS server 12 also routes data packets from the second computer network 34 back to the remote access client 4 using the locally unique port 32 in the combination network address 112. The RAS server 12 is no longer required to replace the private address with an external network address 18 for outbound traffic, and replace an external network address 18 with a private address for inbound traffic. Thus, RSIP of the present invention removes the computational burden of NAT from the RAS server 12 and does not violate the Internet principal of providing end-to-end transmission of data packets between network devices without alternations. This allows end to end protocols, such as IPsec, to work between the remote access client 4 and the second computer network 34.

The preceding description is illustrative of specific embodiments of the invention and various uses thereof. It is set forth for explanatory purposes only, and is not to be taken as limiting the invention.

What we claim is:

1. A method of implementing realm specific Internet protocol in a remote access system, the method comprising the following steps:
   (a) establishing a communication connection between a remote access client and a remote access server on a remote access network;
   (b) requesting by the remote access client from the remote access server a locally unique network address for communicating with network devices on the remote access network;
   (c) receiving by the dialup remote access client from the remote access server on the remote access network a locally unique network address for communicating with network devices on the remote access network;
   (d) receiving by the remote access client from the remote access server on the remote access network the locally unique network address of a network device on the remote access network, wherein the network device is enabled for realm specific Internet protocol;
   (e) if the remote access client is enabled for realm specific Internet protocol,
      (i) requesting by the remote access client from the realm specific Internet protocol enabled network device a globally unique network address and one or more ports to identify the remote access client during communications with an external computer network, using a first protocol;
      (ii) receiving the globally unique network address and the one or more ports on the remote access client from the realm specific Internet protocol enabled network device with the first protocol;
      (iii) updating entries in an address-to-address table maintained by the realm specific Internet protocol enabled network device on the remote access network to reflect assignment of the globally unique network address and one or more ports to the remote access client; and
      (iv) creating a combination network address for the remote access client with the one or more ports and the globally unique network address to identify the remote access client for communications with the external computer network; and
   (f) if the remote access client is not enabled for realm specific Internet protocol, using network address translation with the locally unique network address of the remote access client to identify the remote access client for communications with the external computer network.

2. The method of claim 1 further comprising:
   (a) sending a request from the remote access client to the realm specific Internet protocol enabled network device;
   (b) routing the request from the realm specific Internet protocol enabled network device to the external computer network;
   (c) receiving a reply on the realm specific Internet protocol enabled network device for the remote access client on the globally unique network address for the realm specific Internet protocol enabled network device from the combination network address; and (d) routing the reply from the realm specific Internet protocol enabled network device to the remote access client using the locally unique port from the combination network address.

3. The method of claim 1 wherein the first protocol is a realm specific Internet protocol comprising a realm specific Internet protocol assign request message, a realm specific Internet protocol assign response message, and a combination network address comprising a locally unique port and an globally unique network address.

4. The method of claim 1 wherein the globally unique network address is an Internet protocol address.

5. The method of claim 1 wherein the remote access client is a dialup client.

6. The method of claim 1 wherein the remote access client is a modem on a computer.

7. The method of claim 1 wherein the remote access server comprises a digital signal processing card, a router card and a communications path connecting the digital signal processing card and the router card.

8. The method of claim 7 wherein the communications path connecting the digital signal processing card and the router card is a high-speed data bus.

9. The method of claim 7 wherein the digital signal processing card comprises a modem and a router.

10. The method of claim 1 wherein the remote access network further comprises a RADIUS server and an Internet gateway.

11. The method of claim 1 wherein the remote access server comprises a realm specific Internet protocol gateway and an Internet protocol interfaces.

12. The method of claim 1 wherein the external computer network is an Internet protocol network.

13. The method of claim 1 wherein the external computer network is any of the Internet or an intranet.

14. The method of claim 1 wherein the globally unique network address is an Internet protocol address.

15. The method of claim 1 wherein the remote access network comprises a local area network.

16. The method of claim 1 wherein the step of receiving the globally unique network address and the one or more ports on the remote access client comprises transmitting the globally unique IP address and the one or more ports from the remote access server to the remote access client using an IPCP next server option.

17. The method of claim 16 wherein the IPCP next server option comprises a data packet comprising a type field, a length field, a server type field, an address type field and an address field.

18. A computer readable medium having stored therein instructions for causing a central processing unit to execute a method comprising the following steps:

(a) establishing a communication connection between a remote access client and a remote access server on a remote access network;

(b) requesting by the remote access client from the remote access server a locally unique network address for communicating with network devices on the remote access network;

(c) receiving by the remote access client from the remote access server on the remote access network a locally unique network address for communicating with network devices on the remote access network;

(d) receiving by the remote access client from the remote access server on the remote access network the locally unique network address of a network device on the remote access network, wherein the network device is enabled for realm specific Internet protocol;

(e) if the remote access client is enabled for realm specific Internet protocol,
   (i) requesting by the remote access client from the realm specific Internet protocol enabled network device a globally unique network address and one or more ports to identify the remote access client during communications with an external computer network, using a first protocol;
   (ii) receiving the globally unique network address and the one or more ports on the remote access client from the realm specific Internet protocol enabled network device with the first protocol;
   (iii) updating entries in an address-to-address table maintained by the realm specific Internet protocol enabled network device on the remote access network to reflect assignment of the globally unique network address and one or more ports to the remote access client; and
   (iv) creating a combination network address for the remote access client with the one or more ports and the globally unique network address to identify the remote access client for communications with the external computer network; and (f) if the remote access client is not enabled for realm specific Internet protocol, using network address translation with the locally unique network address of the remote access client to identify the remote access client for communications with the external computer network.

* * * * *